United States Patent [19]
Hope et al.

[11] Patent Number: 4,794,059
[45] Date of Patent: Dec. 27, 1988

[54] LIGHTWEIGHT SOLID STATE RECHARGEABLE BATTERIES

[76] Inventors: Henry F. Hope; Stephen F. Hope, both c/o Hope Industries, Inc., 5701 Moreland Rd., Willow Grove, Pa. 19090

[21] Appl. No.: 161,724

[22] Filed: Feb. 29, 1988

[51] Int. Cl.⁴ ............................................. H01M 6/18
[52] U.S. Cl. ................................................... 429/192
[58] Field of Search ..................... 429/192, 191, 235

[56] References Cited

U.S. PATENT DOCUMENTS

| | | | |
|---|---|---|---|
| 4,471,037 | 9/1984 | Bannister | 429/191 |
| 4,496,638 | 1/1985 | Sugiuchi et al. | 429/192 |
| 4,497,883 | 2/1985 | Murray | 429/194 |
| 4,520,086 | 5/1985 | Skotheim | 429/192 |
| 4,576,883 | 3/1986 | Hope et al. | 429/192 |

*Primary Examiner*—Anthony Skapars
*Attorney, Agent, or Firm*—Z. T. Wobensmith, III

[57] ABSTRACT

Lightweight solid state rechargeable alkaline metal or alkaline earth metal batteries which includes a base current collector and carrier of carbon fibre construction.

10 Claims, 1 Drawing Sheet

LIGHTWEIGHT SOLID STATE RECHARGEABLE BATTERIES

BACKGROUND OF THE INVENTION

1. Field of the Invention

This invention is directed to a light weight solid state rechargeable alkaline metal or alkaline earth metal battery where the current collector and carrier includes a web of carbon fibre material.

2. Description of the Prior Art

There has been considerable interest in rechargeable alkaline metal or alkaline earth metal batteries and the components therefor due to the many advantages that they, and particularly lithium, provides when properly handled and incorporated into batteries. Examples of prior art electrochemical cells, batteries and components are found in the article by Hooper, et al. Advanced Battery Development, Odense University Press, 1984 and in the U.S. Pat. Nos. 4,357,401, to Andre et al., Bannister, 4,471,037, Sugiuchi et al., 4,496,638, Skotheim, 4,520,086, and Hope et al., 4,576,883.

As described in the prior art, solid state alkaline battery construction usually includes the deposition of an alkaline earth metal or alkaline metal, such as lithium onto a metal foil base, which base serves as a current collector and carrier.

As is known alkaline metals and alkaline earth metals are highly reactive, and are particularly suitable for use in batteries due to their ionic and electrical properties. Such metals are usually bonded or coated onto current collecting and carrying bases of metal foil such as copper, nickel or aluminum. The alkaline metals used include lithium, sodium, potassium and cesium with lithium being particularly popular for incorporation into batteries. The alkaline earth metals would include beryllium, magnesium, calcium, strontium and barium. It has been observed that while alkaline metals, such as lithium, may appear initially to not react with copper or other metal foil bases, that over a period of time the alkaline metals often react unfavorably with the metal foil and form an alloy with the metal, resulting in decreased efficiency and a shorter than desired service life. It is important that the metal foil be free from impurities but this is difficult to accomplish and the alkaline metal may also react with even minute amounts of impurities associated with the foil. The base metal foils account for as much as 50% of the total battery weight, so that a reduction in the weight is desirable and will increase the energy density of the battery. It is desirable therefore to provide a suitable current collector which reduces the total battery weight and is inert to the problems associated with the use of alkaline metals, or alkaline earth metals while enhancing their desirable properties.

SUMMARY OF THE INVENTION

It has now been found that the use of a base current collector and carrier that includes a web of inert carbon fibres for alkaline metal or alkaline earth metal batteries provides a battery with a longer shelf life, reduces the cost and weight of the battery, permits the base to function as a double sided collector, permits greater flexibility in manufacturing such batteries, and provides other benefits.

The principal object of the invention is to provide a lightweight solid state rechargeable battery wherein the base current collector and carrier is non-reactive with alkaline or alkaline earth metals.

A further object of the invention is to provide a battery which is of reduced weight.

A further object of the invention is to provide a battery that is easy to manufacture and form into desired configurations.

A further object of the invention is to provide a battery that has a current collector and carrier base which has a greater contact surface area and consequent greater efficiency and capacity than other such bases.

A further object of the invention is to provide a battery in which the base current colector and carrier may be dip coated with the alkaline or alkaline earth metal.

A further object of the invention is to provide a battery which has a base current collector and carrier of low resistance.

A further object of the invention is to provide a battery wherein the base current collector and carrier may have strands of wire incorporated therein to improve its current conducting characteristics.

A further object of the invention is to provide a battery which has a single base but is of double configuration.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof in which.

It should, of course, be understood that the description and drawings herein are illustrative merely and that various modifications and changes can be made in the structures disclosed without departing from the spirit of the invention.

DESCRIPTION OF THE PREFERRED EMBODIMENTS

Solid state rechargeable alkaline metal or alkaline earth metal batteries, and for example lithium batteries, consist of at least an anode layer, a polymer dielectric layer, and a cathode layer. Such batteries can be of virtually any desired size and configuration, and usually include additional layers such as current conducting backing layers, insulating layers and electrode connection layers.

Figure 1:
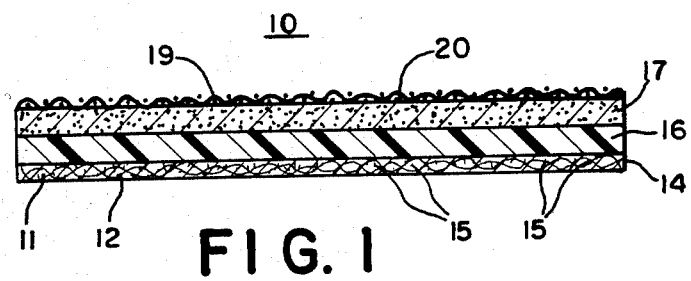
FIG. 1 is a diagrammatic view of one embodiment of a battery constructed in accordance with the invention.

Referring now more particularly to the drawings and FIG. 1 thereof a solid state battery 10 in accordance with the invention is therein illustrated.

The battery 10 to be described is of lithium metal construction but other alkaline metals or alkaline earth metals can be used if desired. The battery 10 includes a base 11 which acts as a current collector and carrier for the battery.

The base 11 as illustrated is formed of a web of carbon fibres 12 which may be woven. While the web 12 is illustrated as being of woven construction, side by side strands (not shown) of fibers may also be used. The carbon fiber web 12 is formed of strands 15 of carbon fibre of well known type which material is substantially free from impurities and has a resistance as low as 700 ohms.

The base II is fabricated by taking the mesh 12 and dipping it into a tank (not shown) which contains an alkaline earth or alkaline metal such as lithium (not shown) in molten form.

The mesh web 12 permits the molten lithium in the tank (not shown) to surround and coat the strands 15 forming a layer 14 on both sides and therefore provides maximum surface contact area which greatly improves performance and capacity in contrast with conventional lithium battery construction where a flat web of metal foil is coated with lithium. Because of the configuration of the web, the web may be coated by wave soldering method, which is not possible on metalfoil, due to the liquidity of lithium. Spraying method or other coating methods may also be used. It should be noted that while the base 12 is illustrated in ribbon-like form, of indefinite length, that any desired configuration can be provided. The base II may then have a layer 16 of polymeric electrolyte composition applied thereto, which composition may be of polymeric material such as polyethylene oxide compounded with lithium salt and as is more fully described in our prior U.S. Pat. No. 4,576,883. The electrolyte mixture may be applied to the base 12 to form layer 16 by any suitable technique such as the well known doctor blade or extruding techniques.

A layer 17 of cathode material is applied on top of layer 16, which may be a thin layer of polymer spheres, which have encapsulated finely ground particles of an intercalation compound such as vanadium oxide compound such as $V_6O_{13}$, to which was added carbon black to improve the electrical conductivity, and an organic solvent. The resultant cathode provides a second collector 19. To further improve the current carrying characteristics of the structure a fine wire mesh 20 may be provided on top of and in contact with the cathode collector 19.

It should be noted that while the base current collector and carrier has been described for use in an anode, that the current collector and carrier will function in a cathode as well.

Figure 2:
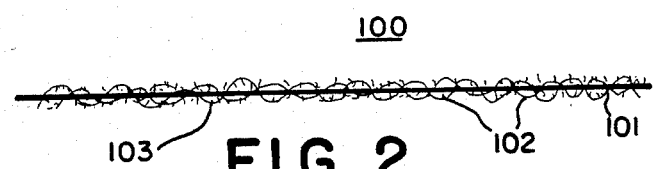
FIG. 2 is a diagrammatic view of another embodiment of battery constructed in accordance with the invention.

Referring now to FIG. 2 another embodiment of base current collector and carrier 100 is there illustrated. The base 100 includes a web 101 of carbon fibre strands 102, with strands of metal wire 103, such as nickel wire, woven therein and extending longitudinally with the web 101. While nickel wire is described, other suitable compatible current carrying materials can be used as desired. The addition of the wire strands 103 is desireable in certain applications, and provides increased current carrying properties. The web 101 may be further assembled into a battery (not shown) as described above for FIG. 1.

Figure 3:
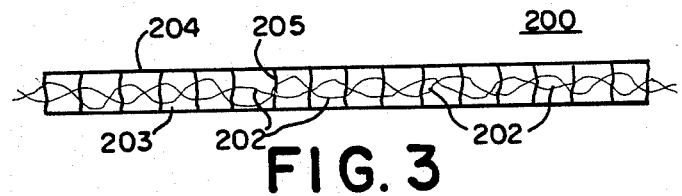
FIG. 3 is a diagrammatic view of another battery constructed in accordance with the invention.

Referring now to FIG. 3 another embodiment of base 200 is therein illustrated. The base 200 includes carbon fibre strands 202 which have been interwoven around wire mesh 203, which is of the "chicken wire" configuration, and is of open mesh with both longitudinal and transverse strands 204 and 205. The strands 204 and 205 may be of nickel but other suitable materials may be used as desired. The resultant web 201 may then be further assembled into a battery as described above for FIG. 1.

Figure 4:
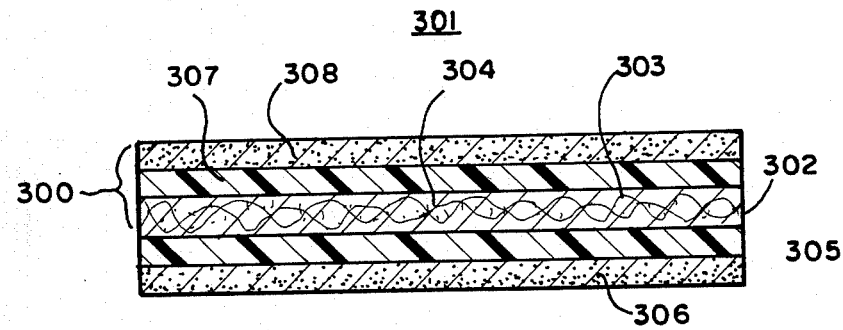
FIG. 4 is a diagrammatic view of a battery with a double sided base current collector and carrier constructed in accordance with the invention.

Referring now to FIG. 4 a double sided base 300 current collector and carrier battery construction is illustrated, the base 300 having been formed as described in FIG. 1.

For illustrative purposes assume that a battery 301 has been formed in accordance with FIG. 1, and which includes a base 302 of carbon fibre strands 303 with a coating of lithium 304 to which a layer 305 of polymeric electrolyte composition has been applied, and that a second layer 306 of cathode material on top of layer 305 has been applied to form a cathode. The coated base 300 is then inverted, and a layer 307 of polymeric electrolyte composition as described above is applied thereto, on top of which a layer of cathode material 308 as described above is applied, which results in a double battery using but one base 302 as a current collector and carrier, thus saving 50% of collector material.

It will thus be seen that structures have been provided with which the objects of the invention are achieved.

We claim:

1. In a solid state rechargeable battery of the alkaline or alkaline earth metal type which includes an anode, a polymer dielectric layer, a cathode and having current collection and carrying base means which comprises
   a web of strands of carbon fibres or carbon graphite fibers and
   a coating of metal on said web.

2. A battery as defined in claim 1 in which
   said current collecting and carrying means is a part of said cathode.

3. A battery as defined in claim 1 in which
   said current collecting and carrying means is a part of said anode.

4. A battery as defined in claim 1 in which
   said coating of metal on said web is an alkaline metal.

5. A battery as defined in claim 1 in which
   said coating of metal on said web is an alkaline earth metal.

6. A battery as defined in claim 1 in which
   said web is woven.

7. A battery as defined in claim 1 in which
   said web is of side by side carbon fibre or carbon graphite strands.

8. A battery as defined in claim 1 in which
   said web includes a plurality of single strands of metal wire interposed with said carbon fibre strands.

9. A battery as defined in claim 1 in which
   said web includes a layer of open mesh conductive metal wire and
   said strands of carbon fibres are interwoven with said open mesh wire.

10. A battery as defined in claim 1 in which
    said cathode has a fine wire mesh in contact therewith.

* * * * *